United States Patent [19]
Bertorelli

[11] 3,956,467
[45] May 11, 1976

[54] PROCESS FOR PRODUCING ALKALI METAL POLYSILICATES

[76] Inventor: Orlando L. Bertorelli, 105 Francis St., Rte. 2, Havre de Grace, Md. 21078

[22] Filed: June 7, 1974

[21] Appl. No.: 477,385

[52] U.S. Cl. ............................ 423/332; 423/333; 423/334; 23/313 AS
[51] Int. Cl.² ........................................ C01B 33/32
[58] Field of Search .............. 423/332, 333, 334; 23/313

[56] References Cited
UNITED STATES PATENTS

| | | | |
|---|---|---|---|
| 1,111,918 | 9/1914 | Paterson | 423/334 |
| 1,198,203 | 9/1916 | Edgerton | 423/334 |
| 2,357,723 | 9/1944 | Beecher et al. | 423/334 |
| 2,881,049 | 4/1959 | Erbe et al. | 423/332 |
| 3,687,640 | 8/1972 | Sams et al. | 23/313 |
| 3,748,103 | 7/1973 | Bean et al. | 423/332 X |
| 3,782,906 | 1/1974 | Pierce | 423/332 |
| 3,835,216 | 9/1974 | Almagro et al. | 423/332 |
| 3,838,192 | 9/1974 | Bertorelli et al. | 423/334 |
| 3,840,348 | 10/1974 | Vessey | 423/332 X |

FOREIGN PATENTS OR APPLICATIONS 203,749  9/1923  United Kingdom ............... 423/333

Primary Examiner—G. Ozaki

[57] ABSTRACT

An improved method for producing alkalimetal polysilicates is disclosed. The polysilicates are produced by hydrothermally reacting an aqueous dispersion of finely-divided silica and an alkali metal hydroxide. The synthesized reaction mixture is then spray dried with the solid product then being fractured and pulverized. The fractured particles are thereafter pelletized and dried in a fluidized bed to produce a product having predetermined characteristics or properties. The product can be used in adhesives, in the production of silica gel, in textiles and the like. However, their use as builders in detergents and in combination with known anionic, nonionic and amphoteric surface active compounds (surfactants) is disclosed as being particularly advantageous.

5 Claims, 3 Drawing Figures

PROCESS FOR PRODUCING ALKALI METAL POLYSILICATES

RELATION TO COPENDING APPLICATION

The present invention is related to U.S. Applications Ser. Nos. 193,484 now U.S. Pat. No. 3,838,192 and 193,425 filed Oct. 28, 1971, now U.S. Pat. No. 3,879,527.

BACKGROUND OF THE INVENTION

1. Field of the Invention

This invention relates to the production of alkali metal silicates and more particularly to a unique process for producing alkali metal polysilicates that may be used as builders in detergents.

2. Description Of The Prior Art

As known in the art, alkali silicates can be manufactured by the so-called "fusion" process wherein a mixture of sand and an alkali metal salt are fused at temperatures sufficiently high to voltalize the acid radical of the salt used. The "glass" thus produced is then cooled and dissolved in water, usually at elevated temperatures and pressures, to yield a product suitable for commercial use. For use in detergents, such silicates are conventionally converted into the hydrated solid form by concentrating the solution, removing the silicates by crystallization and thereafter drying the crystals.

A further known method for producing silicates is the "wet digestion" method wherein a solution of finely divided silica, rendered soluble by digestion with a concentrated solution of caustic alkali, is evaporated and cooled to a suitable crystallization temperature.

Examples of the above and further techniques for producing alkali metal silicates are disclosed in U.S. Pats. Nos. 2,161,515; 2,282,018; 2,357,723 and 3,271,317.

In this regard, and again as is well known in the art, detergent compositions conventionally contain a detergent compound i.e., a surfactant and a "builder", the latter serving in part, to increase the effectiveness of the detergent compound. While phosphate compounds such as sodium tripolyphosphate, have been used somewhat extensively as builders in detergents for many years, the use of other inorganic salts including alkali metal silicates, carbonates, borates and the like is known. An example of built detergents compositions disclosing the use of the above noted inorganic materials is disclosed in U.S. Pat. No. 3,392,121 which issued July 9, 1968 to Gedge.

SUMMARY OF THE INVENTION

Stated broadly, the present invention is an improvement over the process disclosed in U.S. applications Ser. Nos. 193,484 now U.S. Pat. 3,879,527 and 193,485 now U.S. Pat. No. 3,838,193 filed Oct. 28, 1971 which improvement relates to the use of a fluidized bed dryer and cooler in the post processing steps for producing certain unique polysilicates.

In summary, in accordance with the teachings of U.S. applications Ser. Nos. 193,484 now U.S. Pat. No. 3,879,527 and 193,485 now U.S. Pat. No. 3,838,173, polysilicates are produced by the hydrothermal treatment of a dispersion or suspension of silica and an alkali metal hydroxide. The reaction mixture, upon completion of the hydrothermal synthesis, is spray dried, milled and further processed, as will be described in detail hereinafter, to produce polysilicates having particularly advantageous properties. The products, which have polysilicate ions in a highly polymerized, irreversible state may be used in detergents, in the production of adhesives, in textiles and the like.

In accordance with U.S. Application Ser. No. 193,484, alkali metal polysilicates are prepared by the inclusion of sulfate salts in the reaction mass during the hydrothermal synthesis of said alkali polysilicates.

It is a general object of the present invention to provide a further improvement to the process disclosed in said U.S. applications Ser. now U.S. Pat. No. 3,879,527 Nos. 193,484 now U.S. Pat. No. 3,838,192 and 193,485, said improvement being directed to the processing steps which follow the hydrothermal synthesis of the polysilicate.

Another and more particular object is to provide a new and improved process for preparing alkali metal polysilicates having polysilicate ions in a highly polymerized, irreversible state that are functional in the replacement of polyphosphates in detergents.

Still another object of the invention is to provide an improved process comprising the hydrothermal synthesis of alkali metal polysilicates and the further processing of the synthesized product in a manner such that the final product has a relatively high density, low moisture content, and may be used as a direct replacement for phosphates in detergents. Yet still another object is to provide a new and improved process for producing polysilicates, said process providing high flexibility in the production of polysilicates having given or predetermined properties.

The manner in which the foregoing and other objects are achieved in accordance with the present invention will be better understood in view of the following detailed description and accompanying drawings, which form a part of the specification and wherein.

DESCRIPTION OF PREFERRED EMBODIMENT(S)

Figure 1:
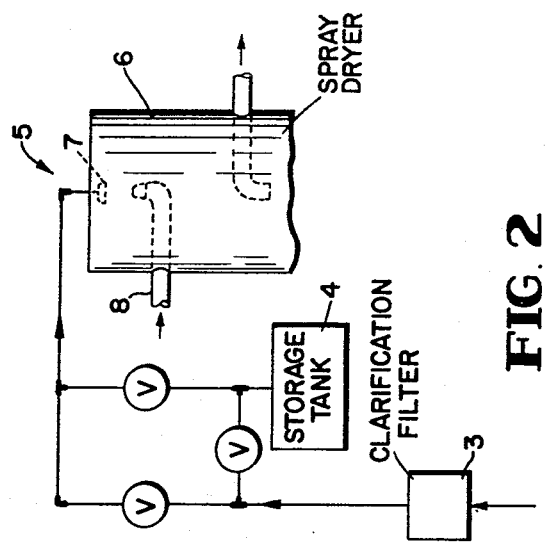
FIG. 1 is a diagrammatic illustration, shown in elevation, of a suitable arrangement of apparatus for carrying out a particularly advantageous method embodiment of the present invention.
Figure 2:
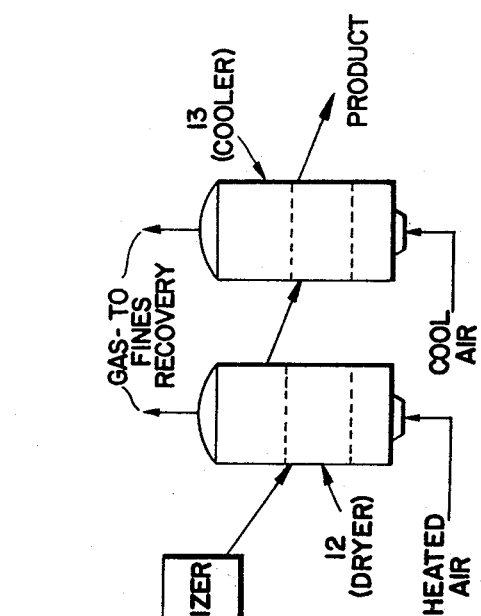
FIG. 2 is a diagrammatic illustration shown in elevation of various post processing steps involved in producing the alkali polysilicate products.
Figure 3:
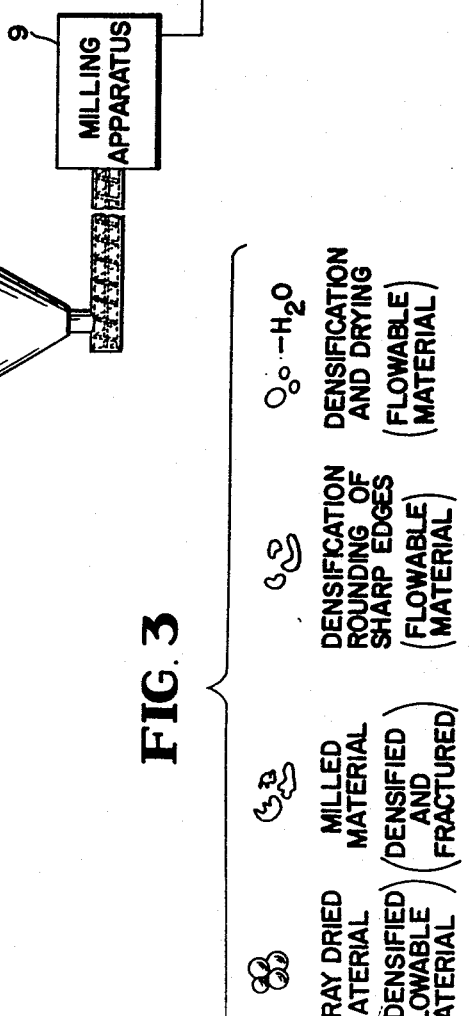
Figure 3:
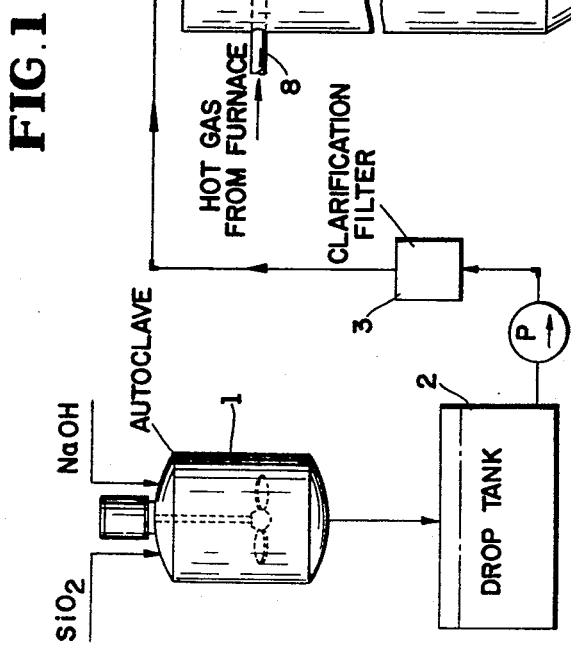

As disclosed in U.S. application Ser. No. 193,485 now U.S. Pat. No. 3,838,192 alkali metal polysilicates having particularly desired and predetermined properties, are produced by hydrothermally reacting or digesting, under certain controlled conditions, an aqueous suspension of finely divided silica and a caustic alkali; spray drying the resulting reaction mixture and thereafter fracturing, pulverizing and agitating the sprayed dried product to form particles having continuously even surfaces.

In accordance with a preferred method embodiment of this application an aqueous suspension or dispersion of finely divided silica ($SiO_2$) and an alkali hydroxide, e.g., sodium hydroxide, are subject to hydrothermal treatment for a period of time sufficient to transform the reactants into alkali metal silicates that are at least partially polymerized and which, as stated above, contain polysilicate ions in a polymerized, irreversible state. A dispersion containing sulfate salt in an amount in the range of from 5–15 percent by weight based on the total weight of said dispersion is preferred.

As taught in said application, the term finely-divided silica refers to a finely divided powder containing at least 99% $SiO_2$ and having a particle size of at least 95% of which are no larger than 75 microns. Silica powders, referred to in the art as "silica flour" or its equivalent are suitable.

The alkali metal hydroxide employed in this application is preferably sodium hydroxide (NaOH). However, other alkali metal hydroxides, i.e., metals of Group Ia of the Periodic Table may be employed. These include potassium, lithium, rubidium, cesium, and francium hydroxide.

At this point it may be noted, and as is generally known in the art, alkali metal silicates having a silica to sodium oxide mol ratio ($SiO_2/Na_2O$) on the order of about 1:1 are in simple ionic form. As indicated, the present invention is directed to a process for making an alkali metal polysilicate that is at least partially polymerized. Therefore the concentration of the reactants, i.e., silica and the alkali metal hydroxide, is critical to the extent that said concentrations must be such that the $SiO_2/Na_2O$ weight ratio of the product is at least 2.3. Products having $SiO_2/Na_2O$ weight ratios of from about 2.3 to 2.7 are particularly advantageous. Thus in the practice of the present invention, and said prior applications, the initial composition of the silica and hydroxide (on a dry basis) is from about 64 to 74% by weight $SiO_2$ and from about 36 to 26 percent by weight $Na_2O$.

As will be described in more detail hereinafter, the hydrothermal treatment of the aqueous dispersion of finely divided silica and the alkali metal hydroxide is effected in a closed vessel at temperatures above the boiling point of the aqueous suspension being treated and under the elevated pressures obtained at such temperatues. Any suitable pressurized equipment, provided with means for maintaining the aqueous mixture under high agitation and provided with means (e.g., a steam jacket) for maintaining the dispersion at the desired temperatures and pressures, may be employed.

In this regard, the hydrothermal treatment of the silica alkali metal hydroxide dispersion may be conducted at temperatures in the range of from about 280°F to 410°F and corresponding pressures of about 65 psig to 290 psig, respectively. Preferred temperature ranges are from 310°F to 350°F. The reaction time is a function of the temperature employed. Reaction periods on the order of about 2.5 – 4.5 hours are required for the above-identified temperature ranges, it being of course understood that higher temperatures result in reduced reaction times.

Turning now to the more specific details of the invention and with reference first to FIG. 1, an alkali metal hydroxide, such as sodium hydroxide, preferably in the form of a concentrated solution containing at least 50% NaOH, is charged to an agitated reaction vessel indicated generally at 1. Thereafter the finely divided silica, which is also preferably introduced as an aqueous slurry, is charged to the reaction vessel. Suitable means are provided in the reactor for maintaining the aqueous dispersion under constant agitation during the charging as well as the reaction period. If desired, the concentrated caustic solution may be preheated to the reaction temperature prior to the introduction of the silica slurry. If the caustic solution is not preheated, the aqueous solution containing the silica and sodium hydroxide is initially preheated to that temperature at which the hydrothermal synthesis is to be conducted. The reaction mixture is maintained at the pre-selected reaction temperature, again while maintaining same under continuous agitation, for a period of time to effect substantially complete transformation of the silica and alkali metal hydroxide into the alkali metal polysilicate.

At the end of the reaction period, the reaction vessel is vented and the mixture is passed, preferably by gravity, into a drop tank 2 which contains dilution water at approximately room or ambient temperatures In this manner the temperature of the reaction mixture is cooled quickly and efficiently and the weight ratio of the reaction product to water adjusted to the concentration required for the spray drying of the product as described hereinbelow.

The aqueous mixture in the drop tank is preferably passed through a clarification filter 3 to remove small quantities of insolubles, such as impurities, unreacted silica and the like. The clarified aqueous mixture may then be passed into a hold or storage tank 4, or fed directly into the upper portion of a spray dryer, indicated generally at 5.

With reference to FIG. 1, the aqueous mixture is introduced into the upper portion of the generally upright or vertical, cylindrical chamber 6 of the spray dryer 5 and passes through a rotating wheel or spray nozzle 7. The latter causes the aqueous mixture to be finely and evenly dispersed within said chamber and in direct contact with a mass of upwardly directed hot gas, i.e., air, introduced through conduit means 8. Suitable control valves (not shown) may be provided for regulating the rate of feed of the reaction mixture, as well as that of the upwardly directed air, into the spray dryer. In accordance with the present invention, the spray drying is preferably effected at relatively high temperatures, with particularly advantageous inlet air temperatures being on the order of from about 700°F to 1000°F. In this manner, the "flashing off" of the water in the spray dryer is effected rapidly with the resultant spray dried droplets being in the form of hollow microspheres.

Turning now to the details of the post-processing techniques employed in the practice of the present invention, the spherical polysilicate particles are collected at the bottom of the spray dryer and fed (as by a screw conveyor) into a suitable milling apparatus 9, such as a hammer mill, which serves to fracture and pulverize the hollow spheres so that the density of the resulting fractured particles is increased to at least 25 lbs/cubic foot.

In accordance with the present invention, and again with reference to FIG. 1, the fractured and pulverized product from the milling apparatus are fed into a pelletizer, indicated generally at 11, and then into a fluidized bed dryer 12. While the apparatus employed in the post-processing techniques of the invention, e.g., mills, pelletizers, fluidized beds, etc., are well known, the sequence steps disclosed herein are unique to the extent that polysilicate products having particularly desirable properties, i.e., a percent moisture content of less than 20 percent, a density on the order of 40–46 lbs/cubic foot and a particle size of minus 14 plus 65 mesh, can be produced from a high temperature spray dried product.

In accordance with the invention it has been found that the high moisture content of the pellets (from the pelletizer) is not sensitive to fusion of the product in the fluid bed dryer 12. Thus materials with moisture contents up to 25–30% can be easily handled in the fluid bed dryer. In contrast, however, with a rotary dryer, material with moisture in excess of 25% often fuses and sticks to itself and the wall of the dryer. In addition, in the fluid bed dryer 12 the drying gas (heated air, etc.) can be above 260°F. From the dryer 12 the material may in accordance with a further embodiment of the invention be passed into a fluidized bed cooler 13. The operation is of course the same except that cool air is used to reduce the temperature of the dryed pellets. It has been found that this operation obviates the formation of large pellets or caking of the dried material. Prior to the invention this has been a significant problem.

As will be readily appreciated by those skilled in the art, the unique process of the present invention may be carried out batchwise or on a semi-continuous or continuous basis. As known, continuous or semi-continuous processes involve a continuous mixing operation in which the reactants, i.e., the silica and sodium hydroxide, are continuously proportioned into a suitable reaction vessel, the reaction mixture then being continuously discharged therefrom and continuously introduced into the postprocessing equipment, etc.

Before turning to specific Examples of the present invention, and again as briefly discussed above, the unique alkali metal polysilicates of the present invention have particular utility for use as builders in detergent compositions. Thus an important object of the invention is to provide a detergent composition comprising a surfactant and, as a builder, the novel polysilicates of the present invention, the latter being employed as a direct replacement for polyphosphates. In this regard, the builder of the invention may be used with any of the conventional detergent classes, i.e., synthetic non-soap anionic, nonionic and/or amphoteric surface active compounds which are suitable as cleansing agents. Anionic surface active compounds can be broadly described as compounds which contain hydrophilic or lyophilic groups in their molecular structure and which ionize in an aqueous medium to give anions containing the lyophilic group. These compounds include the sulfated or sulfonated alkyl, aryl and alkyl aryl hydrocarbons and alkali metal salts thereof, for example, sodium salts of long chain alkyl sulfates, sodium salts of alkyl naphthalene sulfonic acids, sodium salts of sulfonated abietenes, sodium salts or alkyl benzene sulfonic acids particularly those in which the alkyl group contains from 8–24 carbon atoms; sodium salts of sulfonated mineral oils and sodium salts of sulfosuccinic acid esters such as sodium dioctyl sulfosuccinate.

Advantageous anionic surfactants include the higher alkyl aryl sulfonic acids and their alkali metal and alkaline earth metal salts such as for example sodium dodecyl benzene sulfonate, sodium tridecyl sulfonate, magnesium dodecyl benzene sulfonate, potassium tetradecyl benzene sulfonate, ammonium dodecyl toluene sulfonate, lithium pentadecyl benzene sulfonate, sodium dioctyl benzene sulfonate, disodium dodecyl benzene disulfonate, disodium diisopropyl naphthalene disulfonate and the like as well as the alkali metal salts of fatty alcohol esters of sulfuric and sulfonic acids, the alkali metal salts of alkyl aryl (sulfothioic acid) ethers and the alkyl thiosulfuric acid, etc.

Nonionic surface active compounds can be broadly described as compounds which do not ionize but usually acquire hydrophilic characteristics from an oxygenated side chain, such as polyoxyethylene, while the lyophilic part of the molecule may come from fatty acids, phenols, alcohols, amides or amines. Examples of nonionic surfactants include products formed by condensing one or more alkylene oxides of two to four carbon atoms, such as ethylene oxide or propylene oxide, preferably ethylene oxide alone or with other alkylene oxides, with a relatively hydrophobic compound such as a fatty alcohol, fatty acid, sterol, a fatty glyceride, a fatty amine, an aryl amine, a fatty mercaptan, tall oil, etc. Nonionic surface active agents also include those products produced by condensing one or more relatively lower alkyl alcohol amines (such as methanolamine, ethanolamine, propanolamine, etc.) with a fatty acid such as lauric acid, cetyl acid, tall oil fatty acid, abietic acid, etc. to produce the corresponding amide.

Particularly advantageous nonionic surface active agents are condensation products of a hydrophobic compound having at least 1 active hydrogen atom and a lower alkylene oxide (for example the condensation product of an aliphatic alcohol containing from about eight to about eighteen carbon atoms) and from about three to about thirty mols of ethylene oxide per mol of the alcohol, or the condensation product of an alkyl phenol containing from about eight to about eighteen carbon atoms in the alkyl group and from about three to about thirty mols of ethylene oxide per mol of alkyl phenol. Other advantageous nonionic detergents include condensation products of ethylene oxide with a hydrophobic compound formed by condensing propylene oxide with propylene glycol.

Amphoteric surface active compounds can be broadly described as compounds which have both anionic and cationic groups in the same molecule. Such compounds may be grouped into classes corresponding to the nature of the anionic-forming group, which is usually carboxy, sulfo and sulfato. Examples of such compounds include sodium N-coco beta amino propionate, sodium N-tallow beta amino dipropionate, sodium N-lauryl beta iminodipropionate and the like.

Other typical examples of these categories of the anionic, nonionic and/or amphoteric surface active agents are described in Schwartz and Perry "Surface Active Agents" Interscience Publishers, New York (1949) and the Journal of American Oil Chemists Society, volume 34, No. 4, pages 170–216 (April 1957) which are incorporated herein by reference.

The amount of polysilicate builder necessary to be used with the surface active compound (active) may vary depending upon the end use, type of active employed, pH conditions and the like. In general, the builders can be employed in detergent compositions in any desired proportions. The optimum active/builder ratio depends upon the particular active employed and the end use for which the detergent composition is intended but most generally will fall within the range of active/builder weight ratio of about 10:1 to 1:10 and preferably about 4:1 to 1:4.

Detergent compositions produced in accordance with the present invention can be prepared in any of the commercially desirable composition forms such as bar, granular, flake, liquid and tablet form. It should be understood that the present invention is not limited to any particular method for preparing the detergent compositions containing the builder and the surfactant. Such techniques are well known in the industry. Thus, e.g., the builder may be mechanically mixed in the surfactant in the form of a slurry or dissolved in a solution of the surfactant. Additionally, the builder may be admixed with the surfactant in any of the forms in which the surfactant is manufactured.

The invention will be further illustrated by the following examples which set forth particularly advantageous method and composition embodiments. While the examples prove to illustrate the present invention they are not intended to limit it thereto.

PREPARATION OF ALKALI-METAL POLYSILICATES

EXAMPLE 1

9,476 lbs. of a 50% NaOH solution was charged to a stainless steel autoclave provided with means for continuously agitating the solution. A silica slurry, prepared by dispersing 9,269 lbs. of silica flour into 5,054 lbs. of water, was then charged to the reactor. The autoclave was sealed and the temperature of the aqueous mixture preheated (by the introduction of steam into an exterior steam jacket) to 315°F (100 psig) over a 1 hour period. The reaction mixture was thereafter maintained at this temperature for three hours. Continuous agitation was maintained throughout the heat up and reaction period. At the end of the three hour reaction cycle, the steam was shut off and the autoclave partially vented to reduce the pressure to about 60 psig. The vent was then fully opened, the pressure in the autoclave being reduced to 20 psig. At this time a bottom outlet valve of the autoclave was opened and the reaction mixture fed by gravity into a drop tank positioned beneath the autoclave and containing 15,144 lbs. of $H_2O$ at 77°F. The mixture in the drop tank was pumped through a clarification filter and introduced into the upper portion of a spray dryer of the type illustrated in FIG. 1. The aqueous mixture was fed into the spray dryer at a rate of 20,000 lbs. per hour, the concentration of the mixture comprising 4 lbs. of sodium polysilicate per gallon. The speed of the spray wheel or nozzle was about 11,000 rpm. The spray dryer inlet and outlet air temperatures were 900°F and 230°F respectively. The spray dried product was collected and withdrawn from the base of the spray dryer by a screw conveyor and passed into a hammer mill which fractured and pulverized the spherical particles. In this Example, 12,480 lbs. of sodium polysilicate having a $SiO_2/Na_2O$ weight ratio of 2.4 and a density of 24 lbs./ft³ was recovered from the spray dryer. The milling operation increased the density of the product to about 38 lbs/ft³. The product was next passed to a rotary pelletizing drum which was 5 ft. long and 6 ft. in diameter. The drum was divided into 2 sections —a primary pelletizing section and a conditioning section. The fine, fractured particles of 18–20% moisture were fed into the pelletizer at a rate of 3.3 lbs./minute. Water at a rate of 0.072 gal./minute was sprayed on the material with 3 fine sprayers while it tumbled at 6 rpm. Dry feed back of fine silicate was introduced at 3.3 lbs./minute to condition the pellets and to maintain the moisture in the range of about 25–30%. The density of the material from the pelletizer was on the order of about 45 to 50 lbs/ft³ although this could be controlled within the range of from about 25–35 lbs/ft.³.

The material was next passed into a fluid bed dryer (1½ feet diameter - 5 feet high) wherein the wet pellets were contacted with an upwardly directed fluidizing gas (air) heated to a temperature of 450°F. The temperature of the pellets in the fluid bed was 250°F. The wet pellets were fed into the fluidized bed dryer at a rate of 150 lbs/hour. The moisture content of the dried pellets was 18% and the density of the dried pellets was 56 lbs/ft³. The hot, dried pellets were next cooled to ambient temperatures in a fluid bed having the same general construction as the fluid bed dryer. However, the fluidizing of the bed was done with cool air (temperature below 80°F) to reduce the temperature of the pellets.

EXAMPLE 2

The general procedures of Examples 1–4 of U.S. application Ser. No. 193,485 now U.S. Pat. No. 3,838,192 were repeated except where applicable the procedure with respect to the use of the fluid bed dryer as per Example 1 was repeated. The results of these test were substantially the same as those of Examples 1–4 in the said application. For convenience the results of such tests are not repeated hereinbelow. However, the results as shown in the prior application are deemed to be hereby incorporated by reference.

From the above it will be seen that the present invention provides a truly unique and simplified process for producing alkali metal polysilicates that have particular use as builders in detergents. The process of the invention permits high flexibility in the production of a product of any given or desired properties yet at the same time permits the use of standard chemical equipment such as rotary driers, pelletizers and the like. In this regard, pelletization has been carried out for many years by known techniques and apparatus. Two extensively used pelletizing apparatus include the rolling drum and the pin mixer. In general the rolling drum uses dry material while the pin mixer is a wet method employing water or other suitable binding agents. In the present invention water is required to pelletize the silicate. The rotary drum was found to be operable in the practice of the invention while the pin mixer and less conventional inclined rotating disc were not found satisfactory.

As discussed the improved process of the present invention involves the use of a fluidized bed to effect the drying as well as the possible cooling of the pelletized silicate. Such apparatus are well known and disclosed, e.g., in U.S. Pat. No. 2,843,942. In general such apparatus include a substantially vertical, elongated cylindrical chamber that is divided into an upper fluidized bed or zone and a lower gas distribution zone by way of a perforated distributor plate. The perforated distribution plate is perferably made of a high temperature alloy, such as stainless steel, to prevent contamination of the product. In any event however, the apparatus per se does not form a part of the present invention since same is well known. The invention resides, as discussed in detail above, in the unique combination of steps to produce a unique product having predetermined properties, the latter not beng possible prior to the present invention without the use of very complicated techniques and equipment.

What is claimed is:

1. In a method for producing alkali metal silicates, comprising the steps of subjecting an aqueous dispersion including finely divided silica and an alkali metal hydroxide to hydrothermal treatment for a period of time effective to react said silica and said hydroxide to form a silicate that is at least partially polymerized; passing said reaction mixture into a drying chamber and dispersing said mixture in the form of fine droplets in said chamber; contacting said droplets with a mass of air at a temperature sufficient to dry said droplets in the form of minute hollow spheres; fracturing and pulverizing said hollow spheres so that the density of the resulting fractured particles is increased to at least 30 pounds per cubic foot; pelletizing said fractured particles to form particles having continuously even surfaces; and drying and cooling said pellets, the improved steps comprising drying said pellets by introducing said pellets into a drying zone countercurrently to a hot drying and fluidizing gas introduced into a lower section of said zone; passing said hot gas through said zone at a fluidizing velocity to maintain a fluidized mass of pellets so as to heat and dry same, said hot gas being the sole means of drying said pellets; gravitating dried pellets from an upper section of the fluidized mass of pellets in said zone and recovering and cooling the dried pellets.

2. The method in accordance with claim 1 wherein said fractured particles are pelletized by passing same into a substantially horizontally mounted rotary drum and contacting said fractured particles with water to form wet pellets thereof.

3. The method in accordance with claim 1 wherein said finely-divided silica and said hydroxide in said aqueous dispersion are present in amounts sufficient to form a product having a $SiO_2$ to $Na_2O$ weight ratio in the range of from 2.3 to 2.7 to 1; said method further comprising subjecting said dispersion to hydrothermal treatment at a temperature in the range of from 280°F to 410°F for a period of at least 2.5 hours.

4. The method in accordance with claim 1 wherein said aqueous dispersion further comprises a sulfate salt of an alkali metal, said sulfate salt being present in said dispersion in an amount in the range of from 5 to 15 percent by weight, based on the total weight of said dispersion.

5. The method in accordance with claim 1, said method further comprising cooling said fluidized bed dried pellets in a separate fluidizing zone wherein said pellets are contacted with a mass of upwardly directed, cool fluidizing gas.

* * * * *

UNITED STATES PATENT OFFICE
CERTIFICATE OF CORRECTION

PATENT NO. : 3,956,467
DATED : May 11, 1976
INVENTOR(S) : Orlando L. Bertorelli

It is certified that error appears in the above—identified patent and that said Letters Patent are hereby corrected as shown below:

Column 1, lines 7-9, following "U.S. Pat. No." change "3,838,192 and 193,425 filed Oct. 28, 1971, now U.S. Pat. No. 3,879,527" to -- 3,879,527 and 193,585 filed Oct. 28, 1971, now U.S. Pat. No. 3,838,192 --.

Column 1, line 21, change "voltalize" to -- volatilize --.

Column 1, line 57, "3,838,193" should be -- 3,838,192 --.

Column 1, line 63, "3,838,173" should be -- 3,838,192 --.

Column 2, lines 12-14, following "U.S. applications Ser." change "now U.S. Pat. No. 3,879,527 Nos. 193,484 now U.S. Pat. No. 3,838,192 and 193,485," to -- No. 193,484 now U.S. Patent 3,879,527 and No. 193,485 now U.S. Patent 3,838,912, --.

Column 4, line 9, following "temperatures" insert -- . --.

Signed and Sealed this

Seventh Day of September 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

PATENT NO. : 3,956,467
DATED : May 11, 1976
INVENTOR(S) : Orlando L. Bertorelli

It is certified that error appears in the above-identified patent and that said Letters Patent are hereby corrected as shown below:

On title page, following "Inventor" information, insert the following:
-- Assignee: J. M. Huber Corporation, Locust, New Jersey --.

In Abstract, first line, "alkalimetal" should be -- alkali metal --.

Column 1, line 48, "detergents" should be -- detergent --.

Column 2, line 56, "sprayed" should be -- spray --.

Signed and Sealed this

Fifteenth Day of March 1977

[SEAL]

Attest:

RUTH C. MASON
Attesting Officer

C. MARSHALL DANN
Commissioner of Patents and Trademarks